Patented Aug. 13, 1935

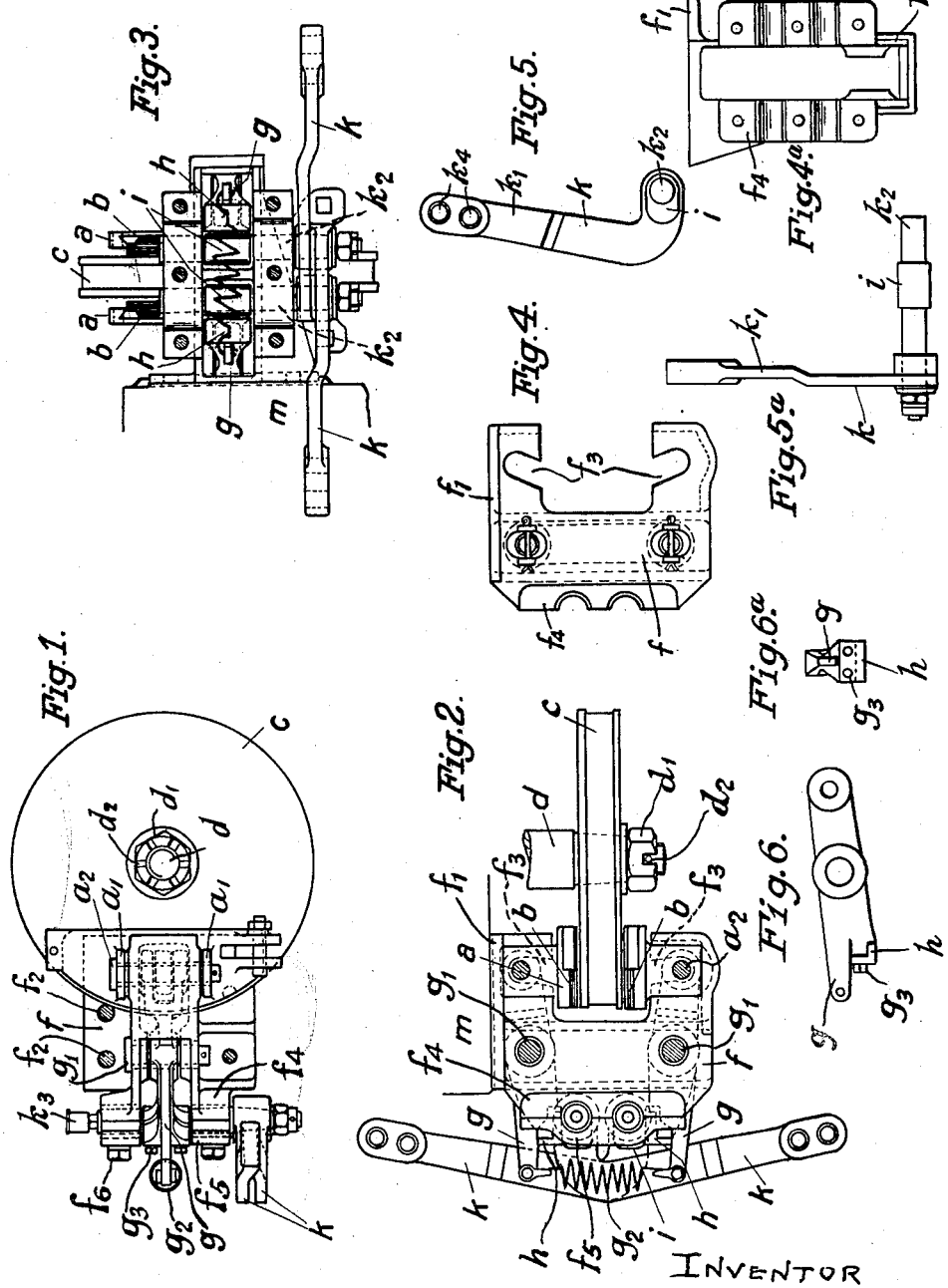

2,011,411

UNITED STATES PATENT OFFICE 2,011,411

BRAKE FOR MOTOR RAIL VEHICLES

Eduard Kindler, Friedenau, near Berlin, Germany, assignor to the firm Berliner Verkehrs, A.-G., Berlin, Germany Application January 28, 1929, Serial No. 335,693
In Germany January 27, 1928

14 Claims. (Cl. 188—73)

(Granted under the provisions of Sec. 14, act of
March 2, 1927; 357 O. G. 5)

This invention relates to improvements in or modifications of the brakes for motor rail vehicles.

The present invention consists in mounting a disc on the motor shaft or on a transmission shaft between the motor and the driving wheel or wheels, onto which disc two brake shoes are adapted to be moved, said brake shoes being each adapted to be actuated in one direction of movement by means of a lever. By this means, as compared with drum brakes for example, the result is obtained that all parts of the brake are fully open to inspection and supervision, while the arranging of the brake upon the armature shaft or transmission shaft brings about an absolutely reliable braking by means of small braking forces. In order to enable the brake to be constructed and designed in this way while employing brake shoes and double-armed brake levers as disclosed in Letters Patent of the United States No. 1,711,602 issued May 7, 1929, these brake levers, according to the present invention, are so constructed as to comprise a short lever arm, preferably in the form of a cam, the action of which is transmitted by means of other double-armed levers to the brake blocks, which are guided in rectilinear guides. This construction of one arm of the brake levers as a short cam-like lever arm ensures a heavy pressure even when small actuating forces are employed. The interposition of the other double-armed lever renders it possible to employ the aforementioned features upon the armature shaft, so that the brake levers can be supported outside the limits of the motor casing.

The invention is illustrated by way of example in the accompanying drawing, in which Fig. 1 is a side elevation showing a typical embodiment of my invention; Fig. 2 is a plan view thereof; Fig. 3 is an end elevation with parts omitted; Fig. 4 is a detail plan view of one of the parts shown in Figs. 1 and 2, and Fig. 4ª is an end elevation thereof; Fig. 5 is a detail plan view of another portion of the structure, and Fig. 5ª is an end elevation thereof; Fig. 6 is a detail plan view of still another part, and Fig. 6ª is an end elevation thereof.

In the drawing, $a$ denotes the brake blocks or brake shoes, provided with coverings or linings $b$ highly resistant to wear. These brake blocks, of flat configuration at their operative surfaces, are provided with lugs $a_1$ pivotally mounted on bolts or pins $a_2$ carried by levers $g$ which are fulcrumed, about midway of their length, on bolts or pins $g_1$. These pins or bolts are carried by a frame or housing $f$ provided with an attaching plate $f_1$ for securing it to a motor housing $m$, by means of screws $f_2$. On the projecting or unsupported end $d$ of the motor shaft is secured rigidly a brake disk $c$, for instance by wedging such disk on the shaft, a nut $d_1$ being screwed on the end of the shaft to hold the disk against longitudinal movement, and a cotter pin $d_2$ locking the nut against rotation. The housing $f$ has two slots $f_3$ (curved with $g_1$ as their centers), to permit the bolts $a_2$ to swing with the levers $g$, so as to carry the brake blocks $a$ toward or from the brake disk $c$, in a direction parallel to the shaft $d$. A spring $g_2$ connecting the two levers $g$ tends to move the brake blocks $a$ out of contact with the disk $c$. The spring $g_2$ also tends to move the levers $g$ into contact with the short cam-like arms $i$ mounted on rock shafts $k_2$. Grease cups $k_3$ are shown at the ends of these shafts. Each shaft $k_2$ also carries an arm $k$, $k_1$ of much greater length than the arm $i$. Each cam-like arm $i$ is thus connected rigidly with the corresponding arm $k$, $k_1$, and each member $i$, $k$, $k_1$ may therefore be described as a cranked lever having two arms ($i$ and $k$, $k_1$ respectively). To form bearings for the shafts $k_2$, the housing $f$ is provided with lateral extensions $f_4$ made with recesses in which the shafts are seated, the bearings being completed by covers $f_5$ secured to the casing $f$ by screws $f_6$. At the points where they engage the arms $i$, the levers $g$ are provided with renewable wear members $h$, the width of the levers being increased at these points, as shown in Figs. 6 and 6ª. The wear members $h$ are L-shaped, and are held by screws $g_3$ in corresponding recesses of the levers $g$. At the ends of the outer lever portions $k_1$ I have shown holes $k_4$ for the attachment of cables or like connections through which a pull may be exerted (toward the left in Fig. 2) in such a manner that the cam-like arms $i$ will swing the levers $g$ in the proper direction to apply the brakes. By interposing the levers $g$ between the cranked levers $k$, $k_1$, $i$ and the brake shoes, I am enabled to locate the levers $k$ clear of the motor housing $m$, so that there will be no obstruction to the movement of the levers $k$, $k_1$. The brake blocks $a$ might be actuated directly by the cam-like lever arms $i$ if there is sufficient space available, for instance if the brake disk $c$ is mounted on some shaft other than the armature shaft $d$ of the motor $m$. The double-armed levers $g$ swing in a plane perpendicular to the brake surface of the disk $c$.

I claim:—

1. In a rail vehicle, a motor, an axle rotatable by means of said motor, a brake disc radially mounted on said rotatable axle, a braking surface on said disc, opposite to the surface a brake shoe being adapted to be moved in a direction parallel to said axle, a double armed lever adapted to swing in a plane perpendicular to said surface, one arm of the double armed lever being connected with said brake shoe, a cranked lever with two arms, the first arm of said cranked lever being in operative relation to the other arm of the double armed lever, and drawing means in connection with the second arm of said cranked lever.

2. In a rail vehicle, a motor, an axle rotatable by means of said motor, a brake disc radially mounted on said rotatable axle, a braking surface on each side of said disc, opposite to each surface a brake shoe being adapted to be moved in a direction parallel to said axle, a pair of double armed levers adapted to swing about separate pivots in a plane perpendicular to said surfaces, one arm of each of the double armed levers being connected with one of said brake shoes, a pair of cranked levers each having two arms, the first arm of each of said cranked levers being in operative relation to the other arm of one of said double-armed levers, and drawing means in connection with the second arm of each of said cranked levers.

3. In a rail vehicle according to claim 1, in which the first arm of the cranked lever is in frictional engagement with the other arm of said double armed lever and has an exchangeable layer at the friction point.

4. In a rail vehicle according to claim 2, in which the first arm of each cranked lever is in frictional engagement with the coacting arm of said double-armed levers and has an exchangeable layer at the friction point.

5. In a rail vehicle according to claim 1, in which the first arm of the cranked lever is of cam-like form.

6. In a rail vehicle according to claim 2, in which the first arm of each of said cranked levers is of cam-like form.

7. In a rail vehicle, a motor shaft, a disc mounted on said shaft and having a lateral brake surface, a brake shoe movable into and out of engagement with said surface, in a direction substantially parallel to said shaft for developing a braking force directly on said motor shaft, a double-armed lever mounted to swing in a plane perpendicular to said surface, one arm of said lever being connected with said brake shoe, and a cranked lever having two arms one of which is in operative relation to the other arm of the first-mentioned lever, the other arm of said cranked lever being adapted for connection with an operating member.

8. A rail vehicle according to claim 7, in which the co-operating arms of the double-armed lever and of the cranked lever swing in the same plane.

9. In a rail vehicle, a motor, an axle rotatable by means of said motor, a brake disc supported by said rotatable axle, a braking surface on each side of the disc, and opposite to each surface a brake shoe being movably arranged and adapted to co-act with said surfaces, a pair of double armed levers adapted to swing about separate pivots in a plane perpendicular to said surfaces, one arm of each of the double armed levers being connected with one of said brake shoes, a pair of cranked levers each having two arms, the first arm of each of said cranked levers being in operative relation to the other arm of one of said double armed levers, and drawing means in connection with the second arm of each of said cranked levers.

10. In a rail vehicle, a motor, an axle rotatable by means of said motor, a brake disc supported by said rotatable axle, a braking surface on said disc, and opposite to said surface a brake shoe being adapted to be moved in a direction parallel to said axle, a double armed lever adapted to swing in a plane perpendicular to said surface, one arm of said double armed lever being connected with said brake shoe, a cranked lever with two arms, the first arm of said cranked lever being adapted to swing in the same plane as the double armed lever and being in operative relation to the other arm of the double armed lever, and drawing means in connection with the second arm of said cranked lever, this second arm being adapted to swing in another plane than the first arm.

11. In a rail vehicle, a motor, an axle rotatable by means of said motor, a brake disc supported by said rotatable axle, a braking surface on each side of the disc, and opposite to each surface a brake shoe being movably arranged and adapted to co-act with said surfaces, a double armed lever adapted to swing in a plane perpendicular to said surfaces, one arm of said double armed lever being connected with one of said brake shoes, a cranked lever with two arms, the first arm of said cranked lever being adapted to swing in the same plane as the double armed lever and being in operative relation to the other arm of the double armed lever, and drawing means in connection with the second arm of said cranked lever, this second arm being adapted to swing in another plane than the first arm.

12. In a rail vehicle, a motor, a casing for said motor, a motor-axle projecting beyond said casing, a disc radially mounted on the projecting end of said motor-axle, a braking surface on said disc, opposite to said surface a brake shoe adapted to be moved in a direction parallel to said motor-axle and to co-act with said surface, and means adapted to move said brake shoe, said means in part extending about a corner of said casing.

13. In a rail vehicle, a motor, a casing for said motor, a motor-axle projecting beyond said casing, a disc radially mounted on said projecting end of said motor-axle, a braking surface on said disc, opposite to said surface a brake shoe adapted to be moved in a direction parallel to said motor-axle and to co-act with said surface, a support carried by said casing, and a lever pivotally arranged on said support in operative relation to said brake shoe.

14. In a rail vehicle according to claim 1, in which said rotatable axle has a free end, and said brake disc is mounted on said free end.

EDUARD KINDLER.